United States Patent [19]

Rowe

[11] 4,019,794

[45] Apr. 26, 1977

[54] ROLLER FOR DISHWASHER RACK

[75] Inventor: Richard A. Rowe, Louisville, Ky.

[73] Assignee: General Electric Company, Louisville, Ky.

[22] Filed: Feb. 18, 1976

[21] Appl. No.: 659,115

[52] U.S. Cl. ............................ 312/311; 308/207 R; 308/3.8; 312/339

[51] Int. Cl.² .................. A47B 97/00; F16C 21/00

[58] Field of Search .......... 312/274, 304, 311, 330, 312/339, 352, 345; 308/202, 207 R, 210, 215, 16, 20

[56] References Cited

UNITED STATES PATENTS

| | | | |
|---|---|---|---|
| 2,878,074 | 3/1959 | Cawl | 308/16 |
| 3,261,647 | 7/1966 | Stewart | 308/3.8 |
| 3,347,612 | 10/1967 | Bebinger | 312/311 |
| 3,527,513 | 9/1970 | Hewko | 308/215 |
| 3,672,743 | 6/1972 | Pompey | 312/311 |

Primary Examiner—Casmir A. Nunberg
Attorney, Agent, or Firm—Francis H. Boos

[57] ABSTRACT

A roller for a dishwasher rack is provided which is easily molded and which includes a flexible peripheral flange that prevents the roller from cutting the tub and door lining material. The roller also includes a generously radiused portion adjacent the dishwasher tub sidewall which prevents it from scoring the tub liner and serves to keep the rack in alignment by abutting the tub sidewall.

3 Claims, 2 Drawing Figures

ROLLER FOR DISHWASHER RACK

BACKGROUND OF THE INVENTION

The invention relates generally to a roller affixed to the article-receiving rack in an automatic dishwater. Specifically, the invention is a roller which has a depending peripheral flange section integral with its support-engaging outer rim. The peripheral flange extends beyond the roller support during normal rack movement; however, should the rack become skewed inside the dishwasher, the flexible peripheral skirt would engage the roller support surface but without cutting or scoring thereof, due to the flexibility of the skirt. Coincident with such contact, a second generously radiused portion of the roller would engage the dishwasher tub sidewall to constrain the rack from further skewed movement and, simultaneously, urge the rack into alignment in the dishwasher.

One previous attempt at providing a dishrack support for a dishwasher is exemplified in U.S. Pat. No. 3,248,158. However, no attempt was made to design the rollers on that dishwasher rack so that they they would not cut a soft polymeric resinous door liner material if it were used. In fact, such cutting could easily occur if support arms 70 were to bend due to loading of the dishwasher rack.

Similarly, a device is shown in U.S. Pat. 3,194,610 which supports a dishwasher rack, but, like the '158 patent design, it does not provide for the eventuality that bending of the support bars or axle would allow the sharp edges of the wheel to cut any soft polymeric door liner.

The present invention is a simple, straightforward, easily-manufactured and readily-employed dishwasher rack wheel which is designed so that it overcomes the above-mentioned prior art deficiencies.

SUMMARY OF THE INVENTION

The invention includes a dishwasher rack wheel which is designed to make the rack self-centering within the dishwasher tub and which will not cut the soft polymeric resinous coating inside the tub and on the door liner. The roller of this invention includes a generously radiused portion which abuts the tub sidewall to achieve the centering effect and a flexible peripheral skirt about the edge of the roller which bends upwardly and inwardly toward the center of the roller when pressure is applied thereto to form a non-cutting flexible edge. More specifically, the invention includes a roller mounted on a dishwasher rack comprising a hub having an axle-receiving aperture extending centrally therethrough, an outer load-bearing rim including a curved support-engaging surface on the exterior thereof, having a flexible peripheral skirt attached to one edge thereof, which edge is most closely adjacent the rack and having a generously curved section defining the opposite edge of the load-bearing rim adjacent the dishwasher tub sidewall, with an intermediate support means connecting the hub and the outer load-bearing rim.

The dishwasher rack roller of this invention has been found to be a useful roller which, when mounted on support arm attached to a dishwasher rack, allows the rack to be easily moved into and at least partially out of a dishwasher washing chamber, and which tends to center the rack and yet does not cut the polysol liner on the tub and door when loading causes the support arms to bend.

Moreover, the roller of this invention has been found to be simpler to fabricate by injection molding than those previously known in the prior art.

DESCRIPTION OF THE PREFERRED EMBODIMENT

Figure 1:
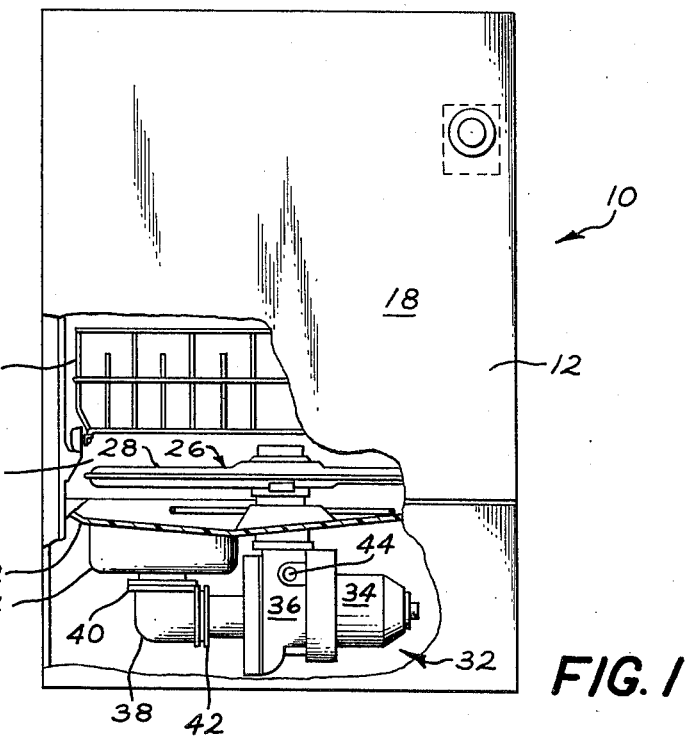
FIG. 1 is a front elevational view in partial cross-section of a dishwasher embodying my improved roller.

Referring to FIG. 1, there is shown an automatic dishwasher 10 having an outer cabinet 12 defining therewithin a wash chamber 14. Within chamber 14 is a dish-supporting rack 16 adapted to receive and support dishes or other articles to be washed by the dishwasher. A door 18 is provided in one wall of cabinet 12 pivotable about a hinge (not shown) to provide access to wash chamber 14.

The lower extremity of wash chamber 14 is defined by a bottom wall 22 which gradually slopes to allow water to flow to the lowest extremity thereof. Disposed at this lowest extremity is a sump 24 which may be formed integrally with bottom wall 22 or may be a separate element secured to an orifice edge in bottom wall 22. Projecting upwardly from bottom wall 22 near the center of wash chamber 14 is a spray means 26 which includes a rotatable arm 28. Rotatable arm 28 includes a plurality of orifices (not shown) through which wash fluid is ejected to effectuate a wash action upon articles supported by rack 16. At least one of these orifices is directed in such a manner that a reaction force will be created by the wash fluid passing therethrough and thereby rotate arm 28. Wash fluid is propelled into spray means 26 by a motor-pump assembly 32 including an electric motor 34 and a pump 36. Conduit 38 is secured to sump 24 by means of a clamp 40 and is secured to pump 36 similarly by means of a clamp 42. Motor-pump assembly 32 is supported from bottom wall 22 in any suitable fashion as is known in the art.

An electrically-operated solenoid (not shown) operates a valve within the housing of pump 36 to direct the wash fluid either upwardly through spray means 26 or out through an effluent discharge conduit 44. The operation of the automatic dishwasher 10 is accomplished by virtue of a control circuit and timer as is known in the art. The timer dial is shown at 46.

Figure 2:
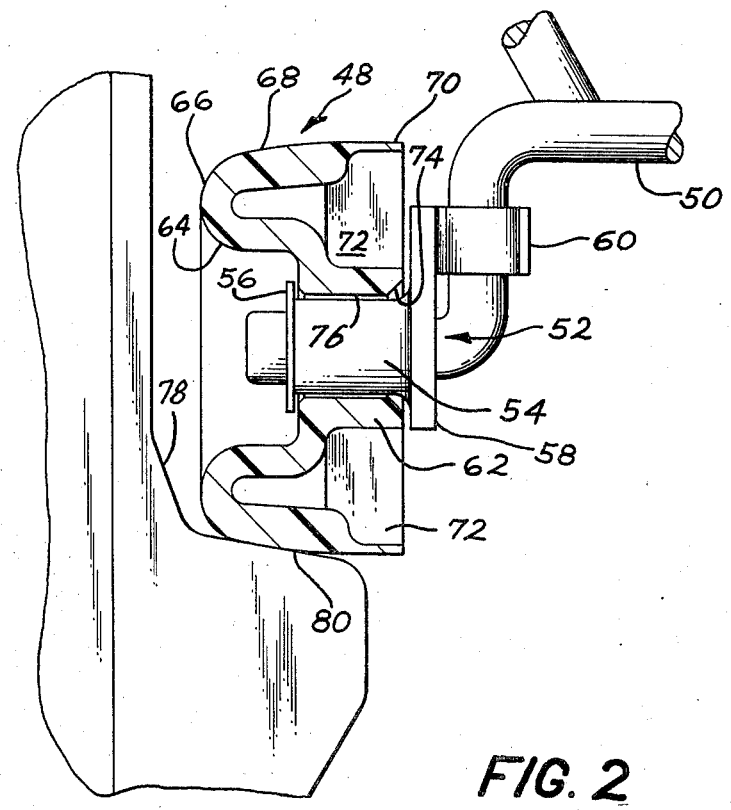
FIG. 2 is an enlarged fragmentary front view of my supporting roller.

Referring now to FIG. 2, it can be seen that roller 48 is mounted upon support arm 50 and held in place by a bushing 52. Bushing 52 includes a radially outwardly facing, generally cylindrical bearing surface 54 which terminates at a shoulder 56. Bushing 52 also includes a flange 58 adjacent the dishwasher rack, which flange 58 includes gripping means 60. Hub 62 of wheel 48 is fitted onto bushing 52 and is held in position by the shoulder and flange thereof. Integral with hub 62 is an intermediate support means 64 which loops in an axial fashion from the hub toward the sidewall of the dishwasher tub. As support means 64 then doubles back, it defines a generously radiused section 66 adjacent with load-bearing rim 68. Load-bearing rim 68 is bounded on one side by generously radiused section 66 and on the other by flexible peripheral skirt 70.

In addition, support rib 72 may be provided to give strength to the design of roller 48.

In actual operation, a dishwasher rack having support arms 50 is first fitted with bushing 52, bushing 52 being slipped on to the support arm and fastened into position by virtue of gripping means 60 circumscribing the support arm. Next, roller 48 is slipped into position by sliding over and bending outwardly facing shoulder 56. Notice, in this regard, the bevelled edges 74 of hub 62. Notice, also that axle-receiving aperture 76 is dimensioned slightly larger than the outer dimension of bushing bearing surface 54 to accommodate the shoulder 56 when roller 48 is being inserted onto bushing 52. Having placed roller 48 on the rack, the rack is now inserted into the wash chamber of the automatic dishwasher.

Also, it should be noted that the inner edge of hub 62 and the distal extremity of peripheral skirt 70 lies in the same plane, thus facilitating the use of injection molding techniques in the fabrication of the rollers of this invention.

During use, it can be seen that the generously radiused section 66 will abut against the tapered portion 78 of the tub sidewall to force the rack to stay in alignment rather than becoming skewed upon insertion and withdrawal from the wash chamber. Similarly, it can be seen that if the rack does become slightly skewed, then the flexible peripheral skirt 70 will engage the support ledge 80 and bend upwardly and inwardly to avoid cutting the ploymeric resinous polysol liner of the tub.

In this regard, it should be noted that as the skirt 70 folds upwardly and inwardly, it shapes into a flat spot which tends to transmit the downward force over a wide surface area to ensure protection of the polysol film. By virtue of the flexibility of skirt 70, this flat spotting occurs around the circumference of the wheel as rolling occurs and continues until the roller has self-aligned and flange 70 is no longer in contact with support ledge 80.

Having thus described the invention, what is claimed is:

1. A roller, mounted on a dishwasher rack adapted to be movable within a dishwasher tub having a polymeric resinous material covering an interior sidewall and a support, comprising:

a hub having an axle-receiving aperture extending centrally therethrough;

an outer load-bearing rim including: (a) a curved support-engaging surface on the exterior thereof; (b) a peripheral skirt attached to one edge of said load-bearing rim adjacent said rack, said skirt being flexible to provide a load-bearing area that does not damage said polymeric resinous material; and (c) a curved section defining the opposite edge of said load-bearing rim adjacent said dishwasher tub sidewall, said curved section being generously radiused to prevent damage to said polymeric resinous material upon abutting said sidewall; and an intermediate support means connecting said hub and said outer load-bearing rim.

2. The roller of claim 1 wherein said intermediate support means extends generally parallel to the axis of the axle-receiving aperture and doubles back to form said generously radiused curved section of said load-bearing rim.

3. The roller of claim 2 wherein the inner edge of said hub lies in the same plane as the distal extremity of said flexible peripheral skirt.

* * * * *